United States Patent
Rossi et al.

(10) Patent No.: US 10,137,621 B2
(45) Date of Patent: Nov. 27, 2018

(54) NOZZLE TERMINAL FOR INJECTORS OF PLASTIC MATERIAL INJECTION MOULDING APPARATUS

(71) Applicant: INGLASS S.p.A., San Polo di Piave (Treviso) (IT)

(72) Inventors: Massimo Rossi, San Polo di Piave (IT); Massimo Bisetto, San Polo di Piave (IT); Fabio Bordignon, San Polo di Piave (IT)

(73) Assignee: INGLASS S.p.A., San Polo di Piave (Treviso) (IT)

( * ) Notice: Subject to any disclaimer, the term of this patent is extended or adjusted under 35 U.S.C. 154(b) by 207 days.

(21) Appl. No.: 15/206,496

(22) Filed: Jul. 11, 2016

(65) Prior Publication Data
US 2017/0015033 A1 Jan. 19, 2017

(30) Foreign Application Priority Data
Jul. 17, 2015 (IT) .......... 102015000035401

(51) Int. Cl.
*B29C 45/17* (2006.01)
*B29C 45/27* (2006.01)

(52) U.S. Cl.
CPC ........ *B29C 45/1777* (2013.01); *B29C 45/278* (2013.01); *B29C 2045/2785* (2013.01); *B29C 2045/2787* (2013.01)

(58) Field of Classification Search
CPC .... B29C 2045/2785; B29C 2045/2787; B29C 45/1777; B29C 45/278
See application file for complete search history.

(56) References Cited

U.S. PATENT DOCUMENTS

2008/0241298 A1* 10/2008 Fischer ............... B29C 45/278
425/143
2013/0306686 A1* 11/2013 Manner ............... B29C 45/27
222/591

FOREIGN PATENT DOCUMENTS

EP          0755766 A1     1/1997
FR          3012992 A      5/2015

OTHER PUBLICATIONS

Search Report dated Mar. 14, 2016 for Italian Patent Application No. 102015000035401, 7 pages.

* cited by examiner

*Primary Examiner* — Jill L Heitbrink
(74) *Attorney, Agent, or Firm* — RMCK Law Group PLC

(57) ABSTRACT

A nozzle terminal for injectors of plastic material injection moulding apparatus, includes a tubular tip defining a flow passage for the injected plastic material and including a radially inner element made of a first abrasion resistant material, an intermediate element made of a second high thermal conductivity material, and a radially outer element made of a third corrosion resistant material. The radially inner, intermediate and radially outer elements are joined to each other in intimate mutual contact, and the radially outer element fully covers the intermediate element thus insulating it from the environment.

12 Claims, 3 Drawing Sheets

US 10,137,621 B2

NOZZLE TERMINAL FOR INJECTORS OF PLASTIC MATERIAL INJECTION MOULDING APPARATUS

CROSS REFERENCE TO RELATED APPLICATIONS

This application claims priority to Italian Patent Application No. 102015000035401 filed on Jul. 17, 2015, the entire disclosure of which is incorporated herein by reference.

FIELD OF THE INVENTION

The present invention regards injectors for plastic material injection moulding apparatus, and more in particular it regards a nozzle terminal for injectors thus made, of the type comprising a tubular tip that defines a flow passage for the injected plastic material, and a ring nut externally and coaxially fixed to the tip.

STATE OF THE PRIOR ART

Traditionally, the tip of the nozzle terminal consists of a single high thermal conductivity material element, for example copper, with poor resistance to abrasion and chemical agents deriving from the passage of the polymeric material injected into the mould by the nozzle. Tips thus made are described and illustrated, for example, in documents U.S. Pat. No. 5,299,928, U.S. Pat. No. 6,988,883, WO-2006123237 and U.S. Pat. No. 7,182,591.

Tips constituted by a single element made of stainless steel resistant to abrasion but with evident limits in terms of thermal conductivity that may give arise to the "stringing" drawback in the moulding process.

Italian patent application No. TO2014A000170 in the name of the same Applicant (not published as of date of priority of the present application) describes a tip made up of a radially inner element made of a material with high mechanical resistance, highly resistant against abrasion and chemical agents, and by a radially outer element made of a second material which, not being at contact with the flow of polymeric material, is selected for the thermal conductivity thereof depending on the polymer to be moulded. Typically, such material may be copper or its alloys. Though efficient as concerns the effects of the moulding process, this solution is subject to the risk of corrosion of the outer conductive element of the tip, due to the gases generated during the moulding.

Document US-2009/0148550 discloses a tip made up of a copper body comprised between two steel reinforcement elements. The outermost element, mostly radially spaced from the intermediate copper body, has the task of reducing the tensions due to the heat dilation of the latter, which however remains exposed to risks of corrosion.

Document KR-101024902B1 describes a tip for a nozzle terminal corresponding to the pre-characterising part of claim 1. In detail, this known tip comprises a radially inner element made of a first abrasion resistant material, an intermediate element made of a second high thermal conductivity material, and a radially outer element made of a third corrosion resistant material. The three elements of the tip are coupled to each other but without this completely hindering the possibility of infiltration of high pressure plastic material, with the ensuing damage to the tip as a whole. In addition, given that the outer element ends before the distal end of the intermediate element made of high thermal conductivity material, i.e. before the free end of the nozzle terminal, such intermediate element remains exposed to the risks of corrosion by the gases released during moulding, as well as infiltrations of the plastic material.

SUMMARY OF THE INVENTION

The object of the invention is to overcome the aforementioned drawbacks, and more in particular obtain a nozzle terminal of the type defined above configured so as to avoid both the infiltration of pressurised plastic material between its components and corrosion effects by the moulding gases, while simultaneously ensuring an efficient thermal conductivity of the tip.

According to the invention, this object is mainly attained due to the fact that the radially outer element fully covers the intermediate element insulating it from the environment.

Infiltrations into the tip made of plastic material are entirely hindered during the injection thanks to this solution idea, and the high thermal conductivity intermediate element is hermetically insulated and thus efficiently protected against risks of corrosion.

According to a preferred embodiment of the invention, the intermediate element is in continuous contact with the radially inner element, and the radially outer element is in turn in continuous contact with the intermediate element. Conveniently, the radially inner, intermediate and radially outer elements are coupled to each other by interference.

In addition, the radially outer element is hermetically fixed at the ends thereof to the radially inner element, for example by soldering to the ends thereof.

The radially inner element comprises a portion with a substantially constant thickness which extends up to the distal end thereof, and the intermediate element is applied to such portion with constant thickness of the radially inner element. The thickness of the intermediate element may also be constant and substantially equal to the thickness of the aforementioned portion of the radially inner element while the radially outer element preferably has a smaller thickness, with a possible thickened terminal portion winding the distal end of the radially inner element.

BRIEF DESCRIPTION OF THE DRAWINGS

The invention will now be described in detail, purely by way of non-limiting example, with reference to the attached drawings, wherein.

DETAILED DESCRIPTION OF THE INVENTION

Figure 1:
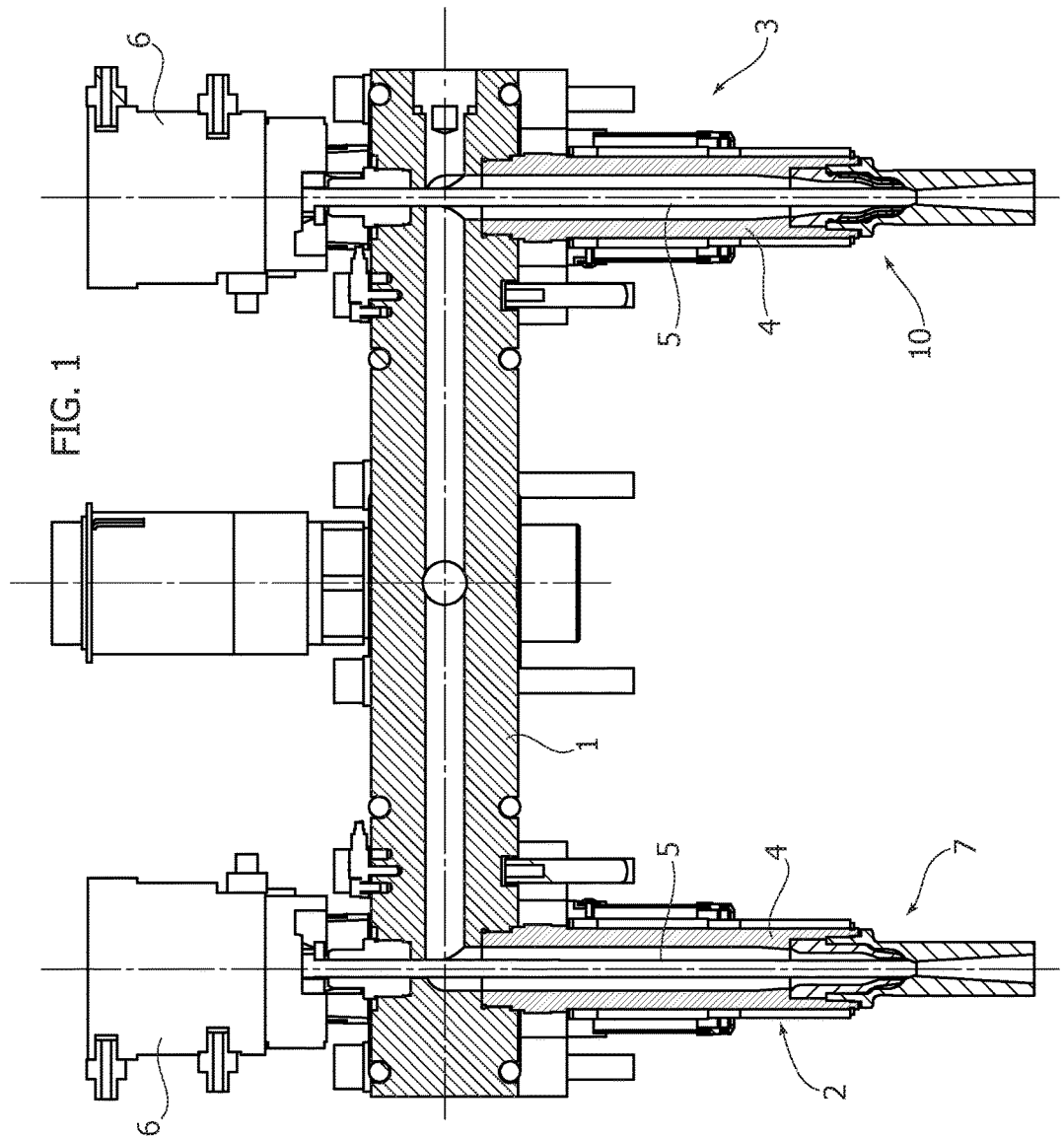
FIG. 1 is a schematic view and in partial vertical section of an injection moulding apparatus provided, by way of example, with two injectors with nozzle terminals respectively conventional and according to the invention.

Initially with reference to FIG. 1, a plastic material injection moulding apparatus conventionally comprises a hot chamber 1 to which the plastic material to be injected in fluid state is supplied under pressure through two injectors 2, 3 of the pin valve type in the case of the illustrated example. Still in a conventional manner, each injector 2,3 comprises a nozzle 4 in communication with the hot chamber 1 and along which a pin valve 5 controlled through the fluid or electrical actuator 6 is axially mobile, conveniently electronically controlled.

The lower end of the pin valve 5 cooperates with a nozzle terminal, to be addressed further hereinafter, to open or close the flow of the plastic material through the injection passage ("gate") of a mould.

Figure 2:
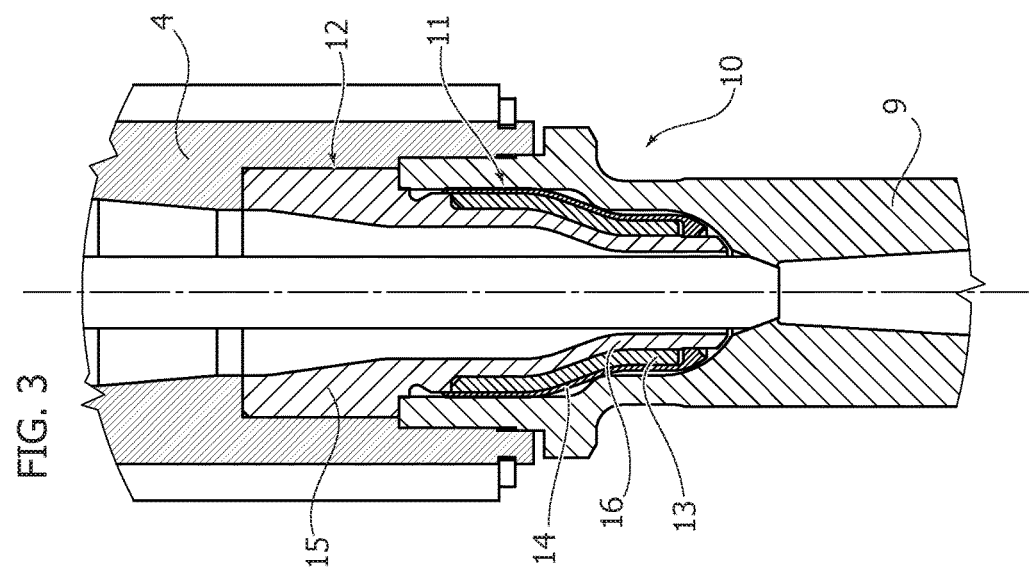
FIG. 2 is partial view, and in larger scale, of the conventional nozzle terminal of FIG. 1.
Figure 5:
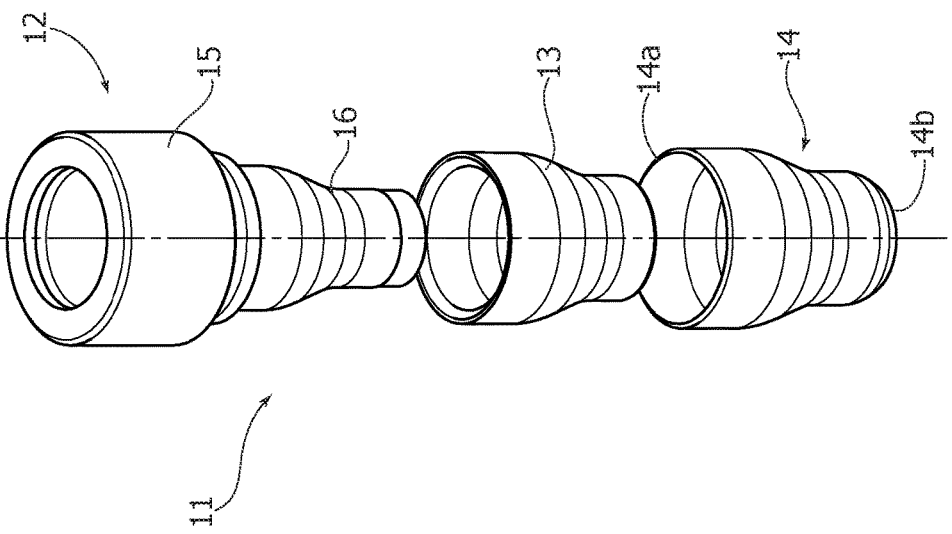
FIG. 5 is an exploded perspective view of the tip.

The injector 2 is provided with a conventional nozzle terminal, i.e. according to the prior art, indicated with reference n° 7 and illustrated further in detail in FIG. 2. It comprises an inner tubular body 8, called tip and formed by a single piece made of high thermal conductivity material (typically copper or its alloys), and a hollow element 9, made of a lower thermal conductivity material, called ring nut. The ring nut 9 projects beneath the tip 8 for sealing coupling, at the free end thereof, with a mould at the relative injection passage. The injector 3 represented on the right part of FIG. 1 is instead provided with a nozzle terminal according to the invention, indicated in its entirety with 10 and represented further in detail in FIGS. 3 to 5. Even in this case, it comprises the ring nut 9, substantially analogous to that according to the prior art, and an inner tubular body or tip indicated in its entirety with 11.

According to the distinctive characteristic of the invention, the tip 11 is formed by three components, permanently joined to each other in continuous intimate mutual contact: A a radially inner element 12 made of a first abrasion resistant material, an intermediate element 13 made of a second high thermal conductivity material, and a radially outer element 14 made of a third corrosion resistant material.

Figure 3:
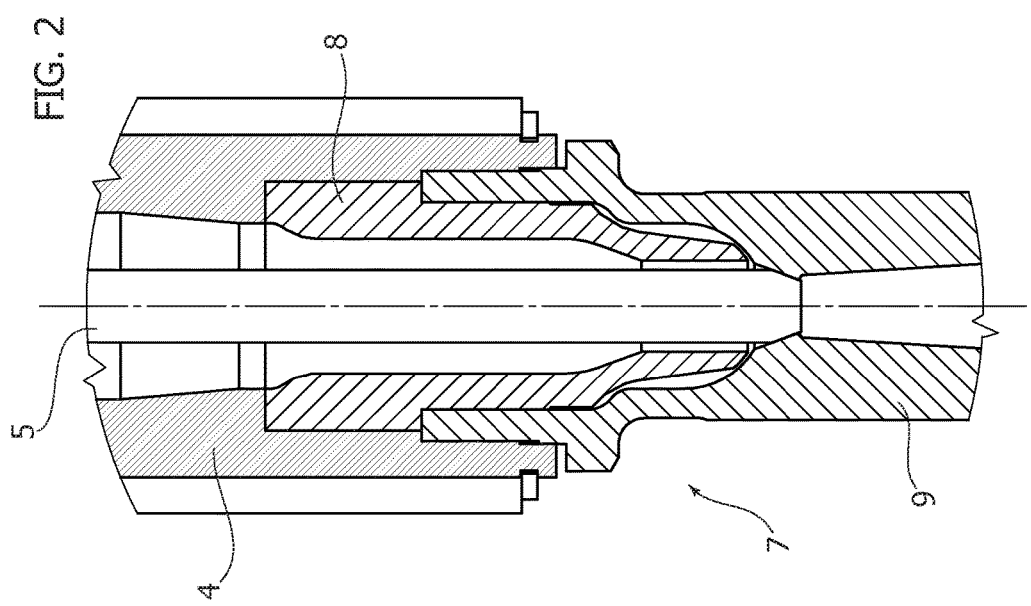
FIG. 3 is a view analogous to FIG. 2 exemplifying a preferred embodiment of the nozzle terminal according to the invention.
Figure 4:
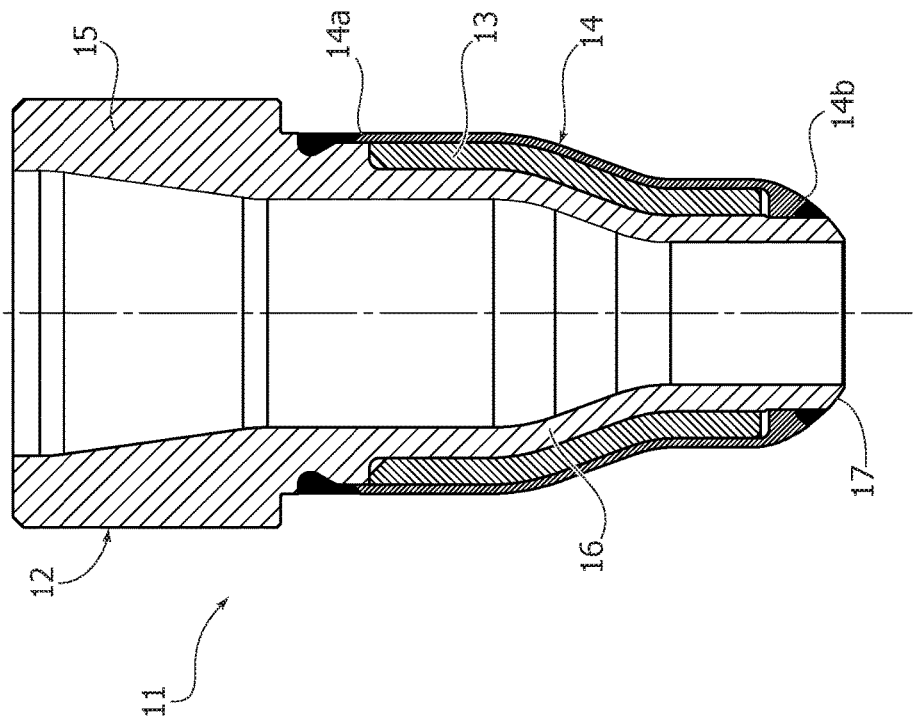
FIG. 4 is a view in larger scale showing only the tip of the nozzle terminal of FIG. 3

The radially inner element 12 has a thickened proximal portion 15, inserted and locked in the nozzle 4 as represented in FIG. 3, and a distal portion 16 which projects outside the nozzle 4 and with the lower end of the pin valve 5 cooperates. The distal portion conveniently has a constant thickness.

The intermediate element 13 surrounds and winds the distal portion 16 of the radially inner element 12 externally in a coaxial fashion, substantially over the entire axial extension of the latter save for a portion corresponding to the free end 17 of the tip 11. The intermediate element 13 is made of a second material, different from the first material, and it also has a thickness constant and substantially equal to that of the distal portion 16 of radially inner element 12.

The radially outer element 14, which—as mentioned fully covers the intermediate element 13 thus hermetically insulating from the external environment—is made of a third material, equal or different with respect to the first material of the radially inner element 12, and it preferably has a thickness considerably smaller than that of the intermediate element 13 and the distal portion 16 of the inner element 12. As clearly visible in FIG. 4, the radially outer element 14 is soldered at the ends 14a, 14b thereof to the distal portion 16 of the radially inner element 12. The end 14b thereof is conveniently thickened and surrounds the free end 17 of the radially inner element 12, thus fully winding it.

As observed previously, the three elements 12, 13 and 14 of the tip 11 are at close contact with respect to each other: the intermediate element 13 is applied in an interfering fashion against the outer surface of the distal portion 16 of the inner element 12 and the outer element 14 is applied in an interfering fashion against the outer surface of the intermediate element 13.

The first material, with which the radially inner element 12 is made, which is at contact with the polymeric material slidingly towards the mould cavity during the injection, is a material with high mechanical resistance, high resistance against wear, oxidation, abrasion and chemical agents: it is preferably a stainless steel, especially of the tempered or hardened martensitic type and characterised with high hardness (49-51 HRC).

The second material which forms the intermediate element 13 is a high conductivity material, selected as a function of the polymeric material to limit the drawbacks that may arise during the moulding (for example stringing and drooling): given that it is not at direct contact with the polymeric material, it is preferably made of copper or its alloys.

The third material of the radially outer element 14, also capable of guaranteeing high mechanical resistance as well as resistance against oxidation, wear, high temperatures and corrosion caused by the gases released during the moulding process, is preferably a stainless steel, especially of the tempered or hardened martensitic type.

The radially outer element 12 and the radially outer element 14 can be obtained using the same material.

Obviously, the construction details and the embodiments of the tip may widely vary with respect to what has been described and illustrated by way of example. In addition, though the invention has been described with reference to a nozzle terminal for injectors of the valve pin type, it also equally advantageously applies to any type of injector, for example also with free or torpedo flow, and any type of ring nut (in the figure or external).

The invention claimed is:

1. A nozzle terminal for injectors of plastic material injection moulding apparatus, comprising a tubular tip defining a flow passage for injected plastic material and a ring nut coaxial to the tip, said tip including a radially inner element made of an abrasion resistant first material, an intermediate element made of a high thermal conductivity second material, and a radially outer element made of a corrosion resistant third material, wherein said radially inner, intermediate and radially outer elements are joined to each other in intimate mutual contact, wherein the radially inner element comprises a distal portion having a substantially constant thickness and extending up to the free end of the tip and the intermediate element is applied to such distal portion and has a constant thickness, which is substantially equal to the thickness of said distal portion of the radially inner element along an entire length of the mutual contact of the radially inner element and the intermediate element, wherein the radially outer element has a thickness less than the thickness of said distal portion of the radially inner element and the intermediate element and has a length extending beyond proximal and distal ends of the intermediate element so as to fully cover the intermediate element and hermetically insulate the intermediate element from the environment, and wherein the radially outer element distal end terminates in a thickened end portion enclosing the free end of the tip.

2. The nozzle terminal according to claim 1, wherein the intermediate element is in continuous contact with the radially inner element.

3. The nozzle terminal according to claim 1, wherein the radially outer element is in continuous contact with the intermediate element.

4. The nozzle terminal according to claim 1, wherein said radially inner, intermediate and radially outer elements are coupled to each other by interference.

5. The nozzle terminal according to claim 1, wherein the radially outer element is hermetically fixed at its ends to the radially inner element.

6. The nozzle terminal according to claim 5, wherein the ends of the radially outer element are soldered to the radially inner element.

7. The nozzle terminal according to claim 1, wherein the first material is a stainless steel of the tempered or hardened martensitic type having a high hardness.

8. The nozzle terminal according to claim 7, wherein the second material is copper or an alloy thereof.

9. The nozzle terminal according to claim 8, wherein the third material is a stainless steel of the tempered or hardened martensitic type having a high hardness.

10. The nozzle terminal according to claim 1, wherein the third material is same as the first material.

11. The nozzle terminal according to claim 1, wherein the radially inner element, radially outer element and intermediate element are each separate and distinct elements joined in mutual contact, and wherein the first, second and third materials are each different from one another.

12. The nozzle terminal according to claim 11, wherein the radially outer element and the radially inner element are in mutual contact with opposing sides of the intermediate element along an entire length of the intermediate element, and wherein each of the radially outer and radially inner elements extend beyond proximal and distal ends of the intermediate element.

\* \* \* \* \*